(12) United States Patent
Hamidouche et al.

(10) Patent No.: US 11,630,994 B2
(45) Date of Patent: Apr. 18, 2023

(54) OPTIMIZED ASYNCHRONOUS TRAINING OF NEURAL NETWORKS USING A DISTRIBUTED PARAMETER SERVER WITH EAGER UPDATES

(71) Applicant: Advanced Micro Devices, Inc., Santa Clara, CA (US)

(72) Inventors: Khaled Hamidouche, Austin, TX (US); Michael W LeBeane, Austin, TX (US); Walter B Benton, Austin, TX (US); Michael L Chu, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 899 days.

(21) Appl. No.: 15/898,433

(22) Filed: Feb. 17, 2018

(65) Prior Publication Data

US 2019/0258924 A1 Aug. 22, 2019

(51) Int. Cl.
*G06N 3/08* (2006.01)
*G06F 15/173* (2006.01)
*G06N 3/084* (2023.01)
*G06N 3/063* (2006.01)
*G06N 3/045* (2023.01)

(52) U.S. Cl.
CPC ......... *G06N 3/08* (2013.01); *G06F 15/17331* (2013.01); *G06N 3/045* (2023.01); *G06N 3/063* (2013.01); *G06N 3/084* (2013.01)

(58) Field of Classification Search
CPC combination set(s) only.
See application file for complete search history.

(56) References Cited

U.S. PATENT DOCUMENTS

| 7,782,851 B2* | 8/2010 | Zhao ............... H04N 21/6375 370/390 |
| 10,951,683 B2* | 3/2021 | Lilienthal ........... H04L 65/4015 |
| 2015/0324690 A1 | 11/2015 | Chilimbi et al. |
| 2016/0321776 A1 | 11/2016 | Zou et al. |
| 2016/0330283 A1* | 11/2016 | Qian ....................... H04L 29/06 |
| 2018/0322386 A1* | 11/2018 | Sridharan ............. G06T 15/005 |
| 2019/0156215 A1* | 5/2019 | Matveev ............ G06V 30/1916 |

OTHER PUBLICATIONS

Addair, "Decentralized and Distributed Machine Learning Model Training with Actors", Fall 2017, published by Stanford University, https://www.scs.stanford.edu/17au-cs244b/labs/projects/addair.pdf. (Year: 2017).*

(Continued)

*Primary Examiner* — Abdullah Al Kawsar
*Assistant Examiner* — Asher H. Jablon
(74) *Attorney, Agent, or Firm* — Liang & Cheng, PC

(57) ABSTRACT

A method of training a neural network includes, at a local computing node, receiving remote parameters from a set of one or more remote computing nodes, initiating execution of a forward pass in a local neural network in the local computing node to determine a final output based on the remote parameters, initiating execution of a backward pass in the local neural network to determine updated parameters for the local neural network, and prior to completion of the backward pass, transmitting a subset of the updated parameters to the set of remote computing nodes.

21 Claims, 6 Drawing Sheets

(56) References Cited

OTHER PUBLICATIONS

Zhang et al. "Poseidon: A System Architecture for Efficient GPU-based Deep Learning on Multiple Machines." Dec. 19, 2015. arXiv:1512.06216v1 (Year: 2015).*

Awan et al., "S-Caffe: Co-designing MPI Runtimes and Caffe for Scalable Deep Learning on Modern GPU Clusters", Feb. 4-8, 2017, In Proceedings of the 22nd ACM SIGPLAN Symposium on Principles and Practice of Parallel Programming (pp. 193-205). (Year: 2017).*

Microsoft. "Microsoft/CNTK." GitHub, Feb. 16, 2018, https://github.com/Microsoft/CNTK.

"IBM PowerAI." IBM PowerAI—Overview, Feb. 15, 2018, www.ibm.com/us-en/marketplace/deep-learning-platform.

Banerjee, D. S., Hamidouche, K., & Panda, D. K. (Dec. 2016). Re-designing CNTK deep learning framework on modern GPU enabled clusters. In 2016 IEEE international conference on cloud computing technology and science (CloudCom) (pp. 144-151). IEEE.

Dean, J., Corrado, G., Monga, R., Chen, K., Devin, M., Mao, M., . . . & Ng, A. Y. (2012). Large scale distributed deep networks. In Advances in neural information processing systems (pp. 1223-1231).

Zhang, H., Hu, Z., Wei, J., Xie, P., Kim, G., Ho, Q., & Xing, E. (2015). Poseidon: A system architecture for efficient gpu-based deep learning on multiple machines. arXiv preprint arXiv:1512.06216.

Examination Report of the Indian Patent Office, Application No. 202017035054 dated Jul. 8, 2022.

Examination Report of the Japanese Patent Office, Application No. 2020-543573 dated Dec. 20, 2022.

* cited by examiner

OPTIMIZED ASYNCHRONOUS TRAINING OF NEURAL NETWORKS USING A DISTRIBUTED PARAMETER SERVER WITH EAGER UPDATES

GOVERNMENT RIGHTS

This invention was made with Government support under PathForward Project with Lawrence Livermore National Security (Prime Contract No. DE-AC52-07NA27344, Subcontract No. B620717 awarded by DOE. The Government has certain rights in this invention.

BACKGROUND

In recent years, learning architectures such as deep neural networks have advanced the fields of computer vision, speech recognition, natural language processing, translation, and many others, in many cases allowing computers to perform comparably or in some cases even exceed the abilities of humans in performing these tasks. The basic building block of a neural network is a neuron, and a single neural network can include an arbitrary number (e.g., thousands or millions) of neurons connected in layers, where neurons in each layer receive their inputs from preceding layers and provide their outputs to subsequent layers. Each neuron generates an output based on performing a function (e.g., summation) on its inputs, where adjustable weights are applied to the inputs. A bias value added to the output can also be adjusted.

Backpropagation is one technique for performing machine learning in a neural network in which the error contribution of each neuron is calculated based on comparing a final output of the neural network with a desired output for a particular input. The weights and biases of the individual neurons contributing to the error are then adjusted so that the neural network achieves the desired output. The error is calculated at the output and the weight adjustment is propagated backwards from the final layer towards the initial layer of the neural network.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

The backpropagation technique can be used when performing multiple instance learning in a neural network, in which parameters in the neural network are adjusted based on operation of the neural network on multiple instances in a training set. Each instance represents a set of inputs and desired outputs against which actual outputs generated by the neural network are compared. A training framework operating according to these methods for a smaller neural network can be implemented in the limited resources of a single computing node; however, scaling the training framework to accommodate much larger neural network can involve distributing computations over multiple computing nodes (e.g., multiple graphics processing unit (GPU) nodes) each performing the backpropagation process on a corresponding portion of the neural network (i.e., a subset of neurons) and/or using a corresponding portion of the training set.

Figure 1:
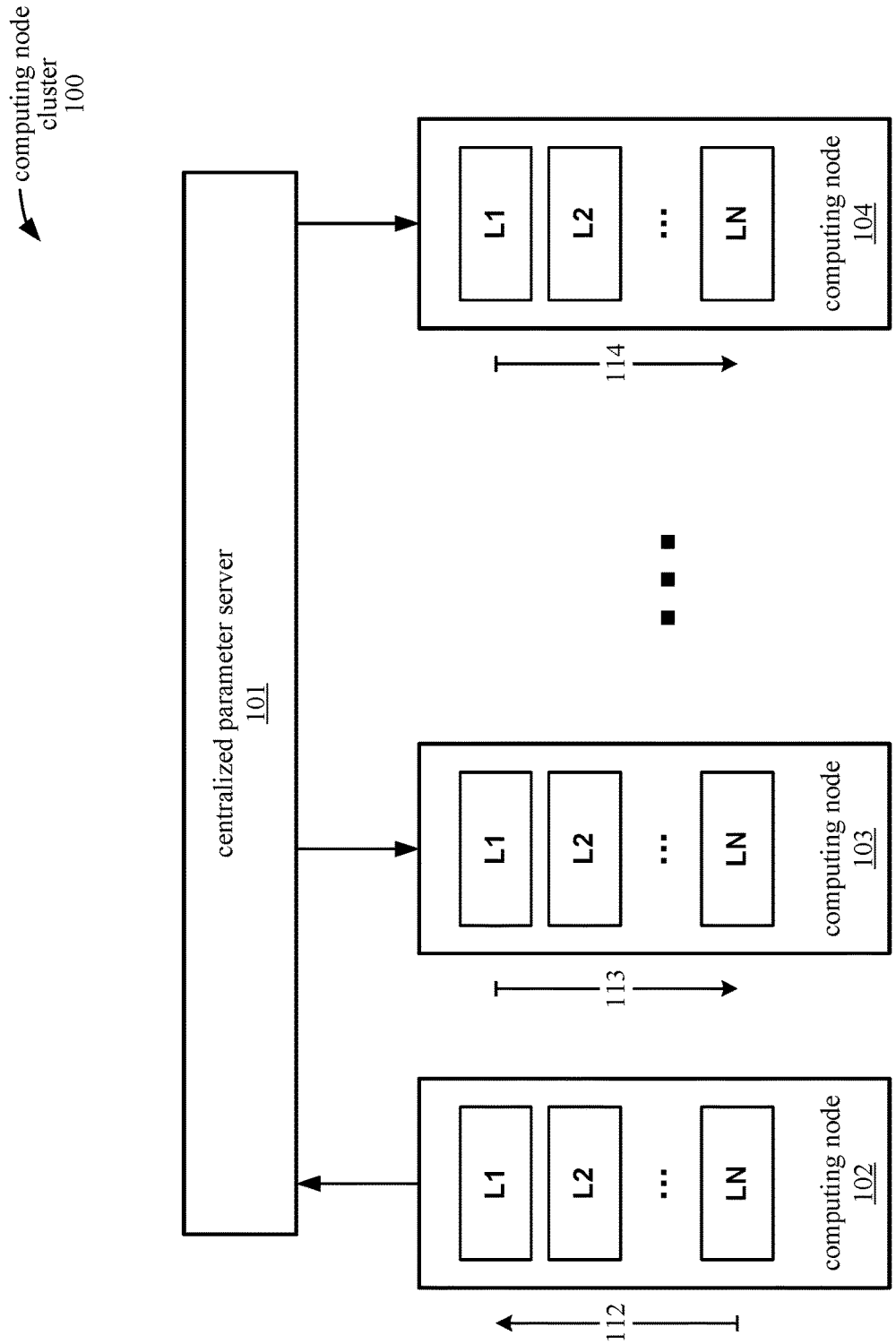
FIG. 1 illustrates an embodiment of a computing node cluster that includes a centralized parameter server for training a neural network.

One method for scaling the neural network training framework over multiple computing nodes uses a centralized parameter server to implement an Asynchronous Stochastic Gradient Descent (SGD) process. FIG. 1 illustrates a block diagram for an embodiment of a computing node cluster 100 in which such a centralized parameter server 101 is used for training a neural network including layer parameters L1-LN, where LX represents the local parameters for layer X of the neural network. During the training process, the centralized parameter server 101 is responsible for updating and computing the layer parameters (e.g., weights and biases) in these layers L1-LN, as well as communicating the parameters to the computing nodes 102-104.

The training of the neural network according to the backpropagation process includes a forward pass and a backward pass. During the forward pass, the neural network is used to calculate a final output (i.e., an output from the final layer) for one of the training instances. During the backward pass, error between the output calculated by the forward pass and a desired output is determined, and the error is propagated backwards through each layer of the neural network to calculate adjusted weights for the neurons in the network. In FIG. 1, the backward pass 112 is performed in computing node 102 and forward passes 113 and 114 are performed in computing nodes 103 and 104, respectively.

A complete backward pass generates a batch of updated parameters for all of the layers in the neural network, including updated weight and/or bias values for some or all of the neurons in the neural network. At the end of the backward pass 112, the batch of updated parameters calculated from the backward pass 112 is transmitted to the centralized parameter server 101 using point to point communication. The centralized parameter server 101 updates the parameters in the other computing nodes 103-104 by transmitting the updated parameters to the computing nodes 103-104. The computing nodes 102-104 operate in parallel and can be performing different iterations of the training loop at any given time; however, in this implementation, the parameters are transmitted to and from the parameter server 101 in connection with the completion of a backward pass.

The centralized parameter server 101 facilitates the communication of updated parameters between multiple computing nodes 102-104, thus allowing the neural network training framework to be scaled across the computing nodes 102-104, rather than being constrained to a single node. However, further scalability can be limited according to the bandwidth and computational limitations of the centralized parameter server 101. The computing nodes 102-104 update their parameters before starting computation of a forward pass for calculating a subsequent batch of parameters, and write the new parameters to the centralized parameter server 101 at the end of the backward pass. Accordingly, the communication of updated parameters between the computing nodes 102-104 and the centralized parameter server 101 is done at batch granularity (i.e., the backward pass is completed for all layers before the updated parameters are transmitted) and is in the critical path of the training process. The communication between the nodes 102-104 and the parameter server 101 is point-to-point and thus includes two critical path communications per iteration, which can negatively impact performance. Furthermore, using a centralized nature of the parameter server 101 tends to increase network contention. In addition, the implementation of a centralized parameter server 101 in a computing node can result in an inefficient use of computational resources, since the computing node in which the parameter server is implemented is not used for training the neural network.

Furthermore, in a training framework that uses the centralized parameter server 101, the computing nodes 102-104 can operate at times using stale parameter data. For example, computing node 102 may have already calculated updated parameters for layers LN-L2; however, node 103 does not receive the updated parameters for LN-L2 until after the backward pass 112 is completed. In the meantime, forward pass 113 continues to use the prior stale values for LN-L2 to calculate its outputs. This update latency can result in training divergence across the multiple computing nodes.

In one embodiment of a neural network training framework, each computing node implements its own parameter server that provides asynchronous parameter updates to the other computing nodes using one-sided (rather than point-to-point) collective communication semantics, by which the updated parameters are broadcast to all of the other computing nodes in the cluster. In one embodiment, the local parameter server for a computing node transmits the updated parameters to the other nodes asynchronously in response to completing the calculation of the updated parameters for a layer or subset of layers by a backward pass in the computing node. As a result, the communication of updated parameters for a particular layer and the computation of updated parameters for one or more subsequent layers can be performed contemporaneously. This approach improves scalability of the training framework because the communication of updates between nodes is not limited by the computational and communication throughput of a single centralized parameter server, and also reduces divergence resulting from the use of stale data.

Figure 2:
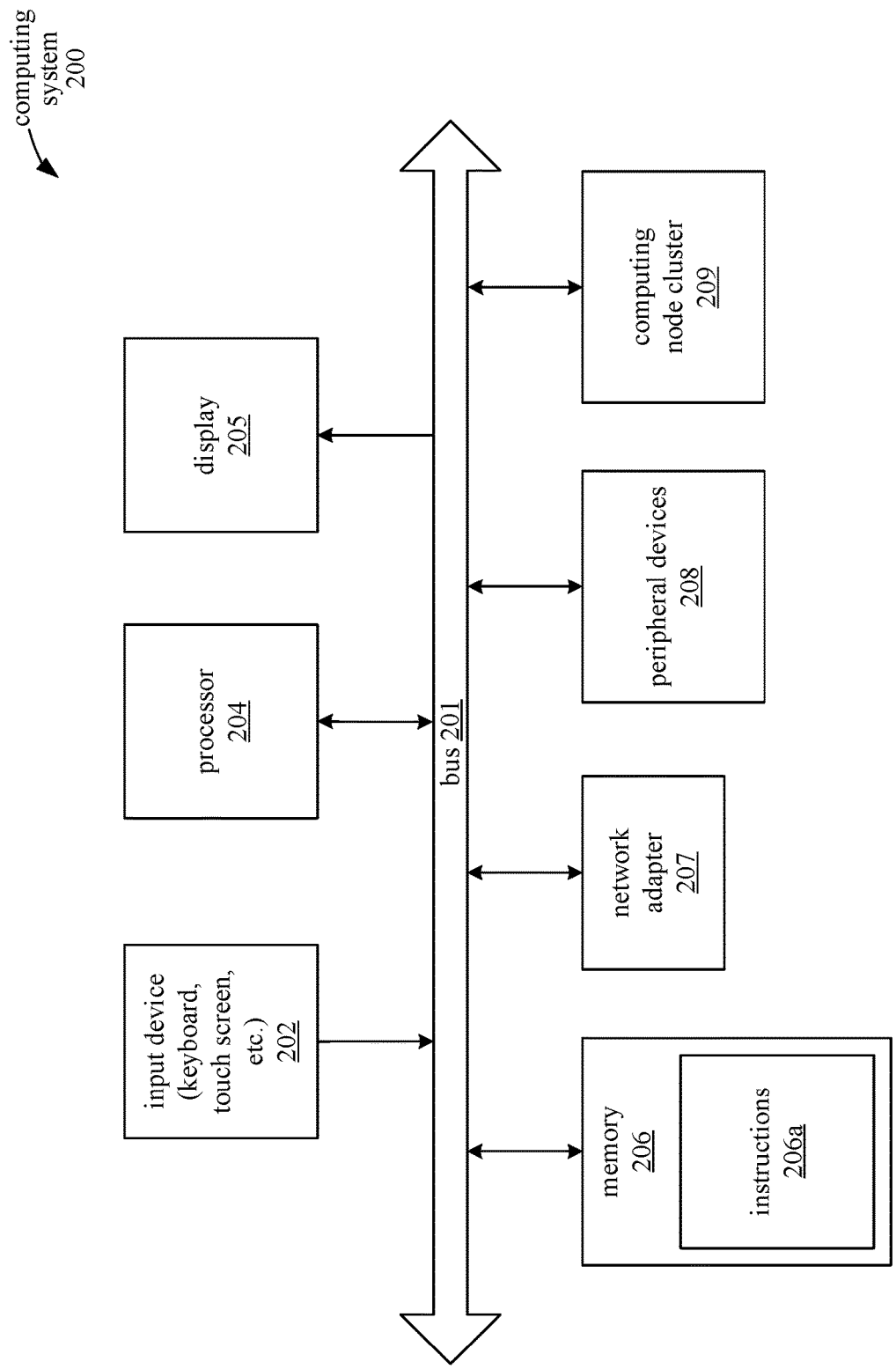
FIG. 2 illustrates a computing system including a computing node cluster for training a neural network, according to an embodiment.

FIG. 2 illustrates an embodiment of a computing system 200 which implements parameter servers distributed across multiple computing nodes for a neural network training framework, as described above. In general, the computing system 200 may be embodied as any of a number of different types of devices, including but not limited to a laptop or desktop computer, mobile phone, server, etc. The computing system 200 includes a number of components 202-208 that communicate with each other through a bus 201. In computing system 200, each of the components 202-208 is capable of communicating with any of the other components 202-208 either directly through the bus 201, or via one or more of the other components 202-208. The components 201-208 in computing system 200 are contained within a single physical casing, such as a laptop or desktop chassis, or a mobile phone casing. In alternative embodiments, some of the components of computing system 200 are embodied as peripheral devices such that the entire computing system 200 does not reside within a single physical casing.

The computing system 200 also includes user interface devices for receiving information from or providing information to a user. Specifically, the computing system 200 includes an input device 202, such as a keyboard, mouse, touch-screen, or other device for receiving information from the user. The computing system 200 displays information to the user via a display 205, such as a monitor, light-emitting diode (LED) display, liquid crystal display, or other output device.

Computing system 200 additionally includes a network adapter 207 for transmitting and receiving data over a wired or wireless network. Computing system 200 also includes one or more peripheral devices 208. The peripheral devices 208 may include mass storage devices, location detection devices, sensors, input devices, or other types of devices used by the computing system 200.

Computing system 200 includes a processor 204 that is configured to receive and execute instructions 206a that are stored in the memory subsystem 206. Memory subsystem 206 includes memory devices used by the computing system 200, such as random-access memory (RAM) modules, read-only memory (ROM) modules, hard disks, and other non-transitory computer-readable media. In one embodiment, the memory subsystem 206 includes logic to implement one or more memory retention controllers each corresponding to a memory region in the memory subsystem 206.

Some embodiments of computing system 200 may include fewer or more components than the embodiment as illustrated in FIG. 2. For example, certain embodiments are implemented without any display 205 or input devices 202. Other embodiments have more than one of a particular component; for example, an embodiment of computing system 200 could have multiple processors 204, network adapters 207, etc.

The computing system 200 also includes a computing node cluster 209, which contains a set of computing nodes in which the neural network training framework is implemented. In one embodiment, computations performed in the computing node cluster 209 are directed by the processor 204 operating according to a program defined by instructions 206a.

Figure 3:
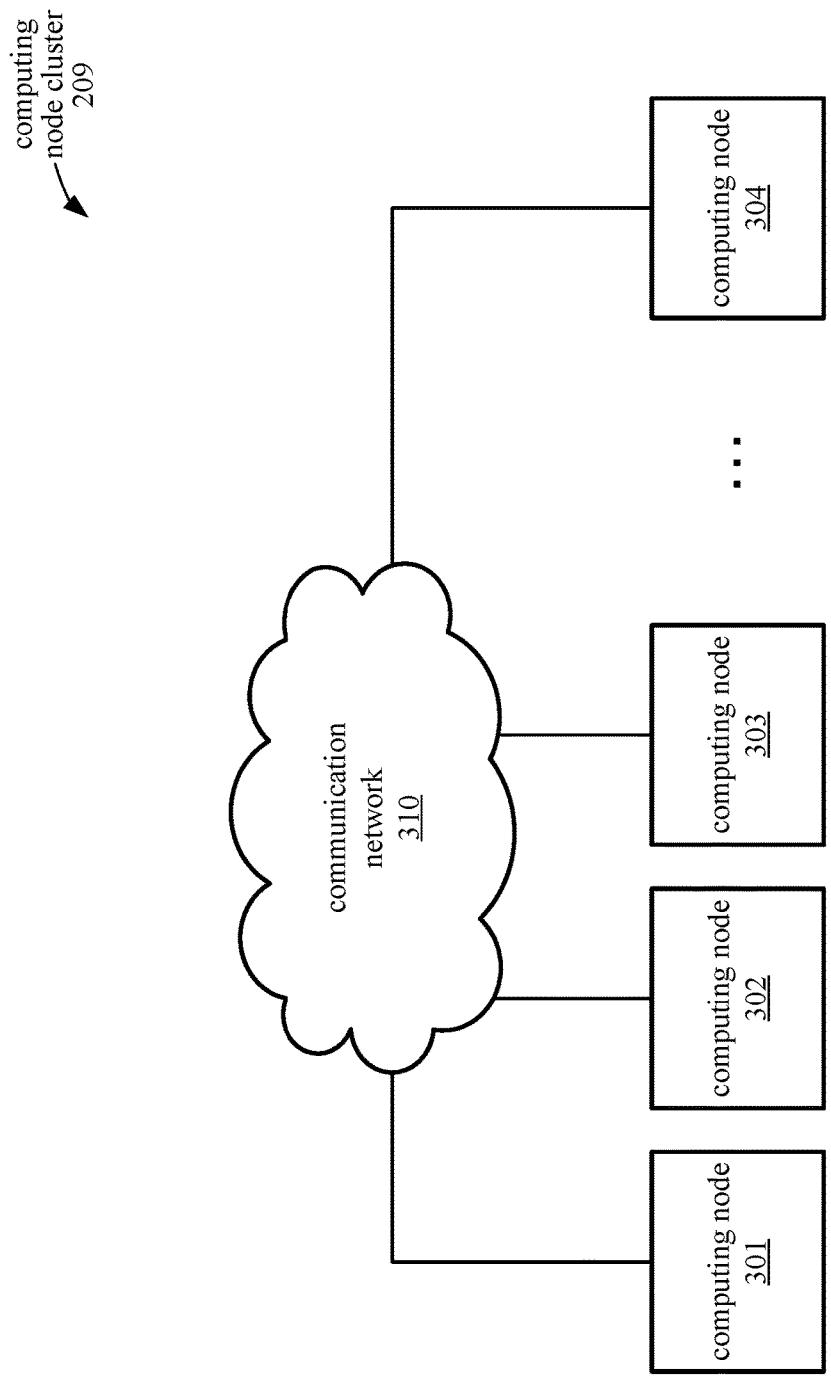
FIG. 3 illustrates a computing node cluster for training a neural network, according to an embodiment.

FIG. 3 illustrates an embodiment of the computing node cluster 209. The computing node cluster 209 includes multiple computing nodes 301-304 that are connected to each other through a communication network 310. The communication network 310 allows communication between each of the computing nodes 301-304 and any of the other computing nodes 301-304. In one embodiment, the communication network 310 is an internal bus within a single computer system chassis or casing to which each of the computing nodes 301-304 is connected. Alternatively, in embodiments where the computing nodes 301-304 are not located within the same chassis or casing, the communication network 310-304 is implemented as a larger network such as a local area network (LAN) or wide area network (WAN). The communication network can be implemented using any combination of various communication protocols and topologies that allows communication between the computing nodes 301-304 as described herein.

In one embodiment, the computing node cluster 209 can include an arbitrary number of computing nodes 301-304. Each of the computing nodes 301-304 in the cluster 209 maintains its own copy of the neural network and determines updated parameters for a different subset of neurons in the neural network. In one embodiment, a large set of training instances is also divided among the computing nodes 301-304, so that each of the computing nodes 301-304 uses a different subset of training instances for training its local copy of the neural network or a subset of neurons in its local copy.

Figure 4:
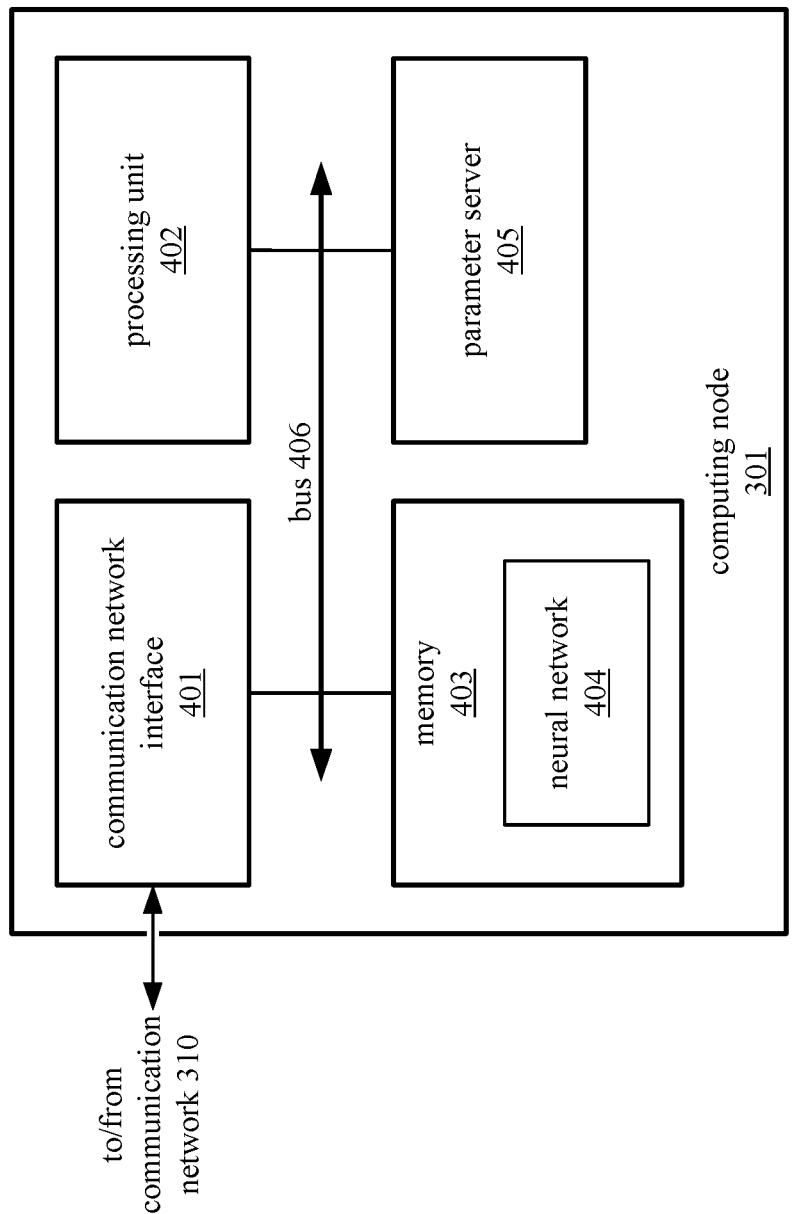
FIG. 4 illustrates components in a computing node including a parameter server, according to an embodiment.

FIG. 4 illustrates an embodiment of a computing node 301 in the computing node cluster 209. In one embodiment, the computing node 301 includes a processing unit 402, such as a CPU or GPU mounted on a carrier board or mainboard that is installed along with similar computing nodes (e.g., nodes 302-304) within a single computer case or chassis. In an alternative embodiment, the computing node 301 is contained in its own case or chassis and connected to similar computing nodes (e.g., nodes 302-304) via a LAN or WAN. In one embodiment, the processing unit 402 and other components 401 and 403-405 in the computing node 301 communicate with each other via a bus 406.

The computing node 301 also includes a memory 403 that stores data. Memory 403 can include volatile and/or non-volatile memory implemented using any of a variety of memory technologies, such as dynamic random access memory (DRAM), static random access memory (SRAM), flash memory, etc. In one embodiment, the data (e.g., variables and data structures) used to define a neural network 404 are stored in the memory 403. This data in memory 403 defines the neurons, connections between the neurons, weights and biases of the neurons, etc. for the neural network 404.

The computing node 301 also includes a communication network interface 401, which allows the computing node 301 to transmit and receive messages via the communication network 310. In particular, the communication network interface 401 receives remote parameters from one or more of the remote computing nodes 302-304 for updating the local neural network 404. In one embodiment, remote direct memory access (RDMA) or a protocol having similar semantics is used to enable remote nodes 302-304 to directly write updated parameters to the local neural network model 404 in memory 403 of the computing node 301. Upon receiving the updated parameters from a remote computing node, the communication network interface 401 writes the received parameters directly to the neural network 404 in memory 403 without involving the operating system of the computing node 301 or its processor 402. Transmissions of updated parameters from computing node 301 to other computing nodes 302-304 is also accomplished without involving the operating system and processor 402 via remote direct memory access or a similar mechanism.

During the neural network training process, the parameter server 405 determines whether updated parameters for the neural network 404 should be transmitted to remote computing nodes (e.g., 302-304), and transmits the updated parameters as appropriate via the communication network interface 401. The parameter server 405 is replicated in each of the computing nodes 301-304 and functions similarly in each instance. In one embodiment, the parameter server 405 is implemented as a hardware circuit module; in alternative embodiments, the parameter server 405 is implemented in firmware, software (e.g., defined by instructions in memory 403 executed by processing unit 402), or a combination of hardware, software, and/or firmware. In one embodiment, the parameter server 405 is implemented as a kernel that runs on each of the computing nodes 301-304 that is tuned to minimize resource utilization.

Figure 5:
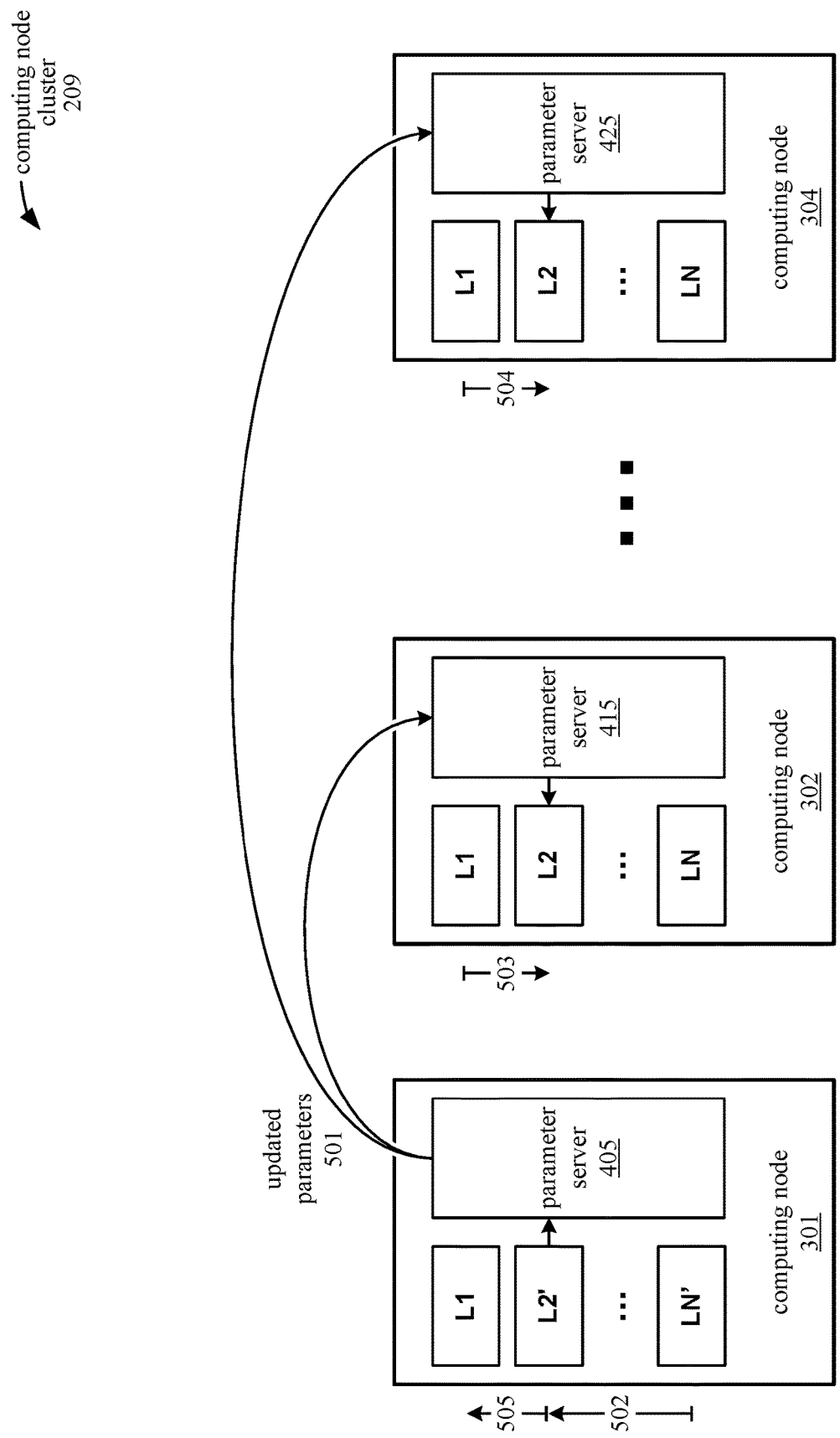
FIG. 5 illustrates distributed parameter servers in a computing node cluster, according to an embodiment.

FIG. 5 is a block diagram illustrating the one-sided collective asynchronous transmission of updated parameters for a neural network from one computing node to other computing nodes in a cluster, according to an embodiment. The computing nodes 301-304 train a neural network using the backpropagation technique, which includes forward and backward pass computations. In the computing node 301, the processing unit 402 executes a forward pass in the neural network 404 to calculate a final output for the neural network based on a set of inputs provided by a training instance and based on previously established parameters (e.g., weights and biases) for the neurons in the neural network 404. The previously established parameters may be an initial set of parameters, or remote parameters received from other computing nodes. The processing unit 402 uses the initial or remote parameters in the first layer of neurons in the neural network to calculate an intermediate output for the first layer based on a set of inputs provided by a training instance. For each subsequent layer of neurons in the local neural network, the processing unit 402 calculates an intermediate output for the layer based on the intermediate output of at least one preceding layer in the local neural network. The output of each layer includes one or more output signals. The output of the final layer is the final output for the neural network.

In one embodiment, the computing node 301 updates the parameters in the neural network 404 asynchronously in response to receiving the updated remote parameters from another computing node in the cluster 209. Accordingly, the parameters are updated during the execution of a forward pass. In other words, the processing unit 402 initiates the execution of a forward pass prior to receiving the remote parameters and, after the neural network is updated with the remote parameters, completes execution of the forward pass to calculate the output based on the newly updated remote parameters.

The remote parameters are received from the other computing nodes 302-304 in the cluster 209 at the communication network interface 401 in the computing node 301. The communication network interface 401 updates the neural network with the remote parameters asynchronously in response to receiving the remote parameters; that is, the timing of the parameter update is independent of whether or not the receiving node has finished the forward pass or the transmitting node or nodes have completed their respective backward passes. In one embodiment, receiving the remote parameters is sufficient to cause the updating of the neural network to occur.

In one embodiment, each of the other computing nodes 302-304 in the cluster update the parameters in their respective instances of the neural network in similar fashion. Accordingly, in each computing node 302-304, the communication network interface of the computing node updates the neural network with received remote parameters during execution of the forward pass (i.e., after initiation of the forward pass and prior to completion of the forward pass), so that the output of the forward pass is calculated using the most up-to-date parameters.

In one embodiment, the communication network interface 401 of the computing node 301 supports a direct memory write mechanism, which allows remote devices to write directly to the local memory 403 via the communication network interface 401 without participation of the processing unit 402 and operating system of the computing node 301. The communication network interface 401 thus responds to receiving updated parameters from the remote computing nodes by asynchronously updating its local copy of the neural network 404 with the remote parameters. This entails performing a direct memory write to store the remote parameters at locations in the local memory 403 where the neural network 404 parameters are stored.

After computation of the forward pass in computing node 301, the processing unit 402 executes a backward pass in the local neural network 404 to determine updated parameters 501 for the neural network. The processing unit 402 executes the backward pass by, for each layer in the local neural network 404, calculating a set of updated parameters for the layer based on the error between the final output determined from the forward pass and a desired output for the training instance that was used to generate the final output via the forward pass. During execution of the backward pass, the computing node 301 performs fine-grained communication of the updated parameters 501 directly to the other computing nodes 302-304, rather than transmitting the updated parameters via any intermediate device (e.g., a centralized parameter server).

In one embodiment, the updated parameters 501 are transmitted by the parameter server 405 to the parameter servers 415-425 in the other computing nodes 302-304 as parameters for each layer are calculated by the backward pass, prior to completion of the entire backward pass. For example, the transmission of the updated parameters 501 may be performed during execution of the backward pass, in response to completion of a layer or a subset of layers in the backward pass. Since the updated parameters 501 are transmitted before the entire backward pass is completed, the parameters 501 represent a subset of the parameters calculated by the entire backward pass (e.g., parameters for neurons in one layer or neurons in a subset of layers).

The processing unit 402 generates the subset of updated parameters 501 from executing a segment 502 of the backward pass that includes computations for a subset of the layers (including layers LN'-L2') in the neural network 404. In one embodiment, the segment 502 includes multiple layers of the neural network 404, as illustrated in FIG. 5. In alternative embodiments, the segment 502 includes no more than a single layer. Accordingly, the updated parameters 501 may include parameters for neurons in multiple layers or in a single layer.

In one embodiment, the parameter server 405 transmits a subset of updated parameters in response to completion of every nth layer in the execution of the backward pass. For example, the segment 502 of the backward pass includes n layers, and the subset of updated parameters 501 is transmitted after completion of the segment 502 and includes parameters for the neurons in the n layers. The parameter server 405 can also adjust n during the execution of the backward pass in response to network conditions, computing resource utilization, or other factors. In one embodiment, the parameter server 405 determines whether the updated parameters 501 are different from the corresponding prior parameters (i.e., calculated from an earlier iteration of the backward pass) for the layer and does not transmit any updated parameters 501 if the parameters have not changed.

Transmissions of updated parameters are performed by the parameter server 405 asynchronously during execution of the backward pass in response to the processing unit 402 determining the updated parameters for neurons in the n layers in the neural network. In other words, the timing of the transmission is independent from whether or not any particular backward pass or forward pass has started or is completed in the computing node 301. This parameter update mechanism also allows the processing unit 402 to continue executing the next segment 505 of the backward pass while the updated parameters 501 calculated from the previous segment 502 are being transmitted.

In addition, the computing nodes 302-304 receiving the updated parameters 501 perform eager updates of their respective copies of the neural network as soon as practicable after the updated parameters 501 are received. In one embodiment, this is accomplished by a direct memory write of the updated parameters 501 to the memories of nodes 302-304. Forward pass segments 503 and 504 being executed in computing nodes 302 and 304, respectively, are able to calculate outputs based on the most recent parameters (e.g., neuron weights and biases) calculated by the backward pass segment 502 without waiting for the entire backward pass to complete in node 301. For example, the updated weights for layer L2, as determined by backward pass segment 502, is used by forward pass segments 503 and 504 even before the backward pass in node 301 is completed.

The asynchronous parameter updates allow different computing nodes to process different training instances at the same time. For example, when the computing nodes 301-304 are used to train a neural network using the same set of training instances in each node, each of the nodes 301-304 can be performing a forward pass or backward pass on the same or different training instances at any given time. As illustrated in FIG. 5, the computing node 301 executes a backward pass (including segment 502) while the computing nodes 302 and 304 execute a forward pass (including segments 503 and 504, respectively). The forward pass in computing node 301 can also be executed contemporaneously with the execution of the backward pass for one or more of the computing nodes 302-304.

Figure 6:
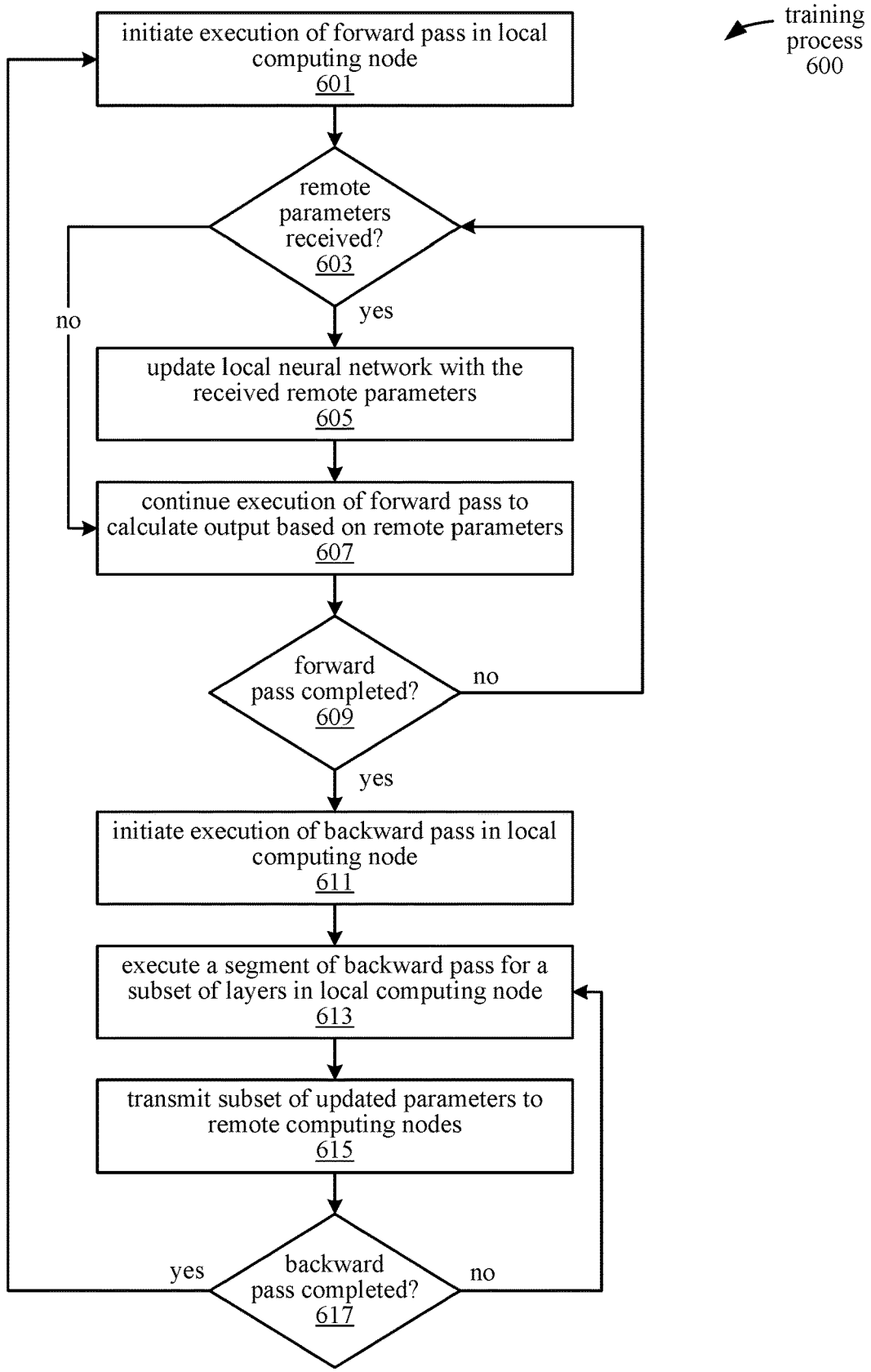
FIG. 6 is a flow diagram illustrating a process for training a neural network, according to an embodiment.

FIG. 6 is a flow diagram illustrating a process 600 for training a neural network, according to an embodiment. The training process 600 is similarly performed in each of the computing nodes 301-304 in the computing node cluster 209. In FIG. 6, the computing node performing the process (e.g., computing node 301) is referred to as the local computing node, while the other nodes (e.g., computing nodes 302-304) in the cluster 209 are referred to as remote computing nodes. Each of the local computing node and the remote computing nodes may perform a particular portion of the process 600 at the same time or at different times.

The process 600 begins at block 601. At block 601, the processing logic 402 initiates execution of a forward pass for a local neural network 404 of the computing node 301. The forward pass accepts input as provided by a training instance and uses the neural network 404 to generate an output based on the provided inputs.

At block 603, the computing node 301 determines whether remote parameters have been received from one or more of the remote computing nodes 302-304. The remote parameters are updated parameters generated from execution of backward passes in the remote computing nodes and are transmitted to the local computing node 301 via the communication network 310. The remote parameters are received by the local computing node 301 at the communication network interface 401. At block 603, if remote parameters have not been received, then the process 600 continues at block 607, wherein the processing unit 402 continues execution of the forward pass using the existing parameters for the neural network. At block 603, if remote parameters have been received, then the process 600 continues at block 605.

At block 605, in response to receiving the remote parameters, the computing node 301 updates its copy of the neural network with the remote parameters. In one embodiment, the communication network interface 401 includes logic circuitry for performing a direct memory write of the remote parameters to the local memory 403 in which the neural network 404 parameters are stored. Accordingly, the communication network interface 401 updates the local neural network 404 by writing the received remote parameters directly to the memory locations in memory 403 at which the corresponding neural network parameters are stored. In one embodiment, the neural network 404 is updated with the received remote parameters asynchronously in response to receiving the remote parameters, so that the ongoing forward pass uses the updated parameters. Accordingly, the computing node 301 receives remote parameters from the other computing nodes 302-304 and updates the parameters in the local neural network 404 accordingly at any time during the execution of the forward pass.

At block 607, after updating the neural network 404 with the remote parameters, the processing unit 402 continues execution of the forward pass to calculate an output for the training instance based on the remote parameters. For instance, the remote parameters may be used as weights and/or biases in the neurons of the neural network, where the weights and/or biases affect the output generated from the forward pass.

At block 609, if the forward pass is not completed (i.e., the computations have not been performed for all the layers in the neural network), then the process 600 returns to block 603. Accordingly, the processing unit 402 executes the forward pass (as provided at block 607) while updating the parameters in the neural network according to any received remote parameters (as provided at blocks 603-605) until the forward pass is completed at block 609. When the forward pass is completed, the process 600 continues at block 611.

At block 611, the processing unit 402 initiates the execution of a backward pass in the computing node 301. During the backward pass, the processing unit 402 determines the difference between a desired output for the training instance and the final output generated by the forward pass, then propagates this error in backward sequence through the layers of the neural network to determine each neuron's contribution to the error. The parameters for each neuron are adjusted to reduce the error based on their respective contributions. The backward pass computations thus determine a set of updated parameters for the neural network.

At block 613, a segment 502 of the backward pass is performed for a subset of the layers of neurons in the neural network 404; accordingly, a corresponding subset of the updated parameters is determined. In one embodiment, the subset of layers includes only one layer; alternatively, the subset of layers includes more than one layer and fewer than all of the layers in the neural network 404 (e.g., as illustrated in FIG. 5).

At block 615, the parameter server 405 transmits the subset of updated parameters determined from block 613 to the remote computing nodes 302-304. In one embodiment, the parameter server 405 avoids transmitting parameters that are not changed by the backward pass. Accordingly, the parameter server 405 transmits the updated parameters 501 in response to determining that the subset of updated parameters for the subset of one or more layers differs from a set of corresponding prior parameters for the subset. In one embodiment, the parameter server 405 only transmits parameters that have changed relative to the corresponding prior parameters, where the corresponding prior parameters are the most recently used parameter values that were used for the same neurons during the most recent forward pass prior to the ongoing backward pass.

The transmission of the subset of updated parameters 501 is performed asynchronously during execution of the backward pass in response to determining the updated parameters 501 for the subset of layers in the segment 502 of the backward pass. In one embodiment, the segment 502 includes multiple layers LN'-L2' such that the updated parameters 501 are transmitted asynchronously in response to completion of the last layer in the segment 502. In an alternative embodiment, the segment 502 of the backward pass includes no more than a single layer, such that the subset of the updated parameters 501 is transmitted asynchronously during execution of the backward pass in response to determining the updated parameters 501 for the single layer.

At block 617, if the backward pass is not completed (i.e., the backward pass has not yet traversed all of the layers in the neural network), the process 600 returns to block 613. At block 613, the processing unit 402 continues execution of the backward pass for the layers that have not yet been processed. In one embodiment, the transmitting the subset of the updated parameters 501, as provided at block 615, is performed contemporaneously with continuing execution of the backward pass for one or more subsequent layers in the local neural network as provided at block 613.

Blocks 613-617 thus repeat until the backward pass is completed. In one embodiment, the backward pass includes multiple segments each traversing a different subset of the layers in the neural network. Accordingly, the subset of the updated parameters 501 is one of a number of subsets of parameters transmitted in response to completion of each segment in the execution of the backward pass. In one embodiment, each segment traverses n layers and each subset of updated parameters accordingly includes parameters for the n layers. In some embodiments, the value of n is adjusted dynamically during execution of the backward pass in response to network conditions, computing resource utilization, or other factors. At block 617, if the backward pass is completed, the process 600 returns to block 601 to initiate the next subsequent forward pass.

In one embodiment, remote parameter updates received from the other nodes 302-304 during execution of the backward pass are queued until the forward pass begins. Thus, prior to starting the forward pass at block 601, the neural network 404 is updated with the queued remote parameters. Alternatively, the remote parameters received during execution of the backward pass can be used to update the neural network during execution of the backward pass (i.e., before the backward pass has completed). In one embodiment, the neural network 404 is updated with any remote parameters received during execution of the backward pass (at blocks 611-617) as they are received via direct memory writes to the local memory 403, by a similar process as provided at blocks 603 and 605.

Each of the other computing nodes 302-304 includes components similar to computing node 301; accordingly, each of these nodes also performs a process similar to process 600. In one embodiment, each of the computing nodes 301-304 performs a similar backpropagation process, including forward passes and backward passes, to calculate parameters for different portions of the same neural network. In particular, each of the computing nodes 301-304 stores its own copy of the neural network and computes parameters for a different subset of neurons in the neural network. In one embodiment, each neuron in the neural network is included in no more than one of these subsets of neurons. For example, node 301 may calculate parameters for a first subset of neurons, while node 302 calculates parameters for a second subset of neurons, where the first subset of neurons and the second subset of neurons are mutually exclusive sets. In an alternative embodiment, each neuron in the neural network is included in more than one of the subsets of neurons. Each computing node 301-304 updates the parameters in its own copy of the neural network based on its own computations and based on updated parameters received from the other computing nodes.

Considering computing node 301 as a local computing node, the remote computing nodes 302-304 also each perform the process 600 to calculate parameters for different subsets of neurons. The times at which backward passes and forward passes are executed in any of the nodes 301-304 are independent from the execution times of backward and forward passes in other nodes.

Accordingly, a backward pass in the local computing node 301 can be executed contemporaneously with forward passes in one or more of the remote computing nodes 302-304 so that updated parameters transmitted by the local computing node 301 during the local backward pass are used to update the remote copies of the neural network in the remote computing nodes 302-304 during their respective forward passes. Each of the remote computing nodes 302-304 executes its own version of block 603 and, in response to receiving the subset of updated parameters 501 from the local computing node 301, updates its copy of the neural network with the received parameters 501, as similarly provided at block 605. In one embodiment, the parameters 501 received at each remote computing node are for a subset of neurons that is mutually exclusive with the set of neurons for which parameters are calculated in the remote computing node. Each remote computing node 302-304 completes its own remote forward pass based on the updated parameters 501 as updated in their respective copies of the neural network stored in the remote computing node.

Backward passes in one or more of the remote computing nodes 302-304 (similar to blocks 611-617) can be executed contemporaneously with execution of the forward pass in the local neural network 404 of local computing node 301. In this case, updated parameters determined from the remote backward passes are transmitted to the local computing node 301 and used to update the local neural network 404 during execution of the local forward pass. Each of the remote computing nodes 302-304 executes a remote backward pass in its own copy of the neural network to determine updated parameters for its assigned subset of neurons.

By the operation of the training process 600 in each of the computing nodes 301-304, each computing node performs backward passes in which updated parameters are asynchronously transmitted with fine granularity as they are determined, and performs forward passes in which parameters in the neural network are asynchronously updated during the execution of the forward pass as they are received. Using this approach, the delay between determining the updated parameters in one computing node and updating the parameters in another computing node are minimized. The fine granularity of the updates and the resulting smaller sizes of update messages reduce the likelihood of network congestion since the network load can be distributed more evenly over time. Further, due to the asynchronous nature of the messages and updates, the successful sending and receiving of the update messages is not in the critical path for the training process. Overall, this results in faster convergence in the training process, while more efficiently utilizing the available network and computing resources.

A method 600 of training a neural network 404 includes, at a local computing node 301, receiving remote parameters from a set of one or more remote computing nodes 302-304, initiating execution of a forward pass in a local neural network 404 in the local computing node 301 to determine an output based on the remote parameters, initiating execution of a backward pass in the local neural network 404 to determine updated parameters 501 for the local neural network 404, and prior to completion of the backward pass, transmitting a subset of the updated parameters 501 to the set of remote computing nodes 302-304.

In the method 600, the execution of the backward pass includes calculating the subset of the updated parameters 501 for a first layer in the local neural network 404, and transmitting the subset of the updated parameters 501 is performed in response to determining that the subset of updated parameters 501 for the layer differs from a set of corresponding prior parameters for the layer.

In the method 600, the execution of the backward pass includes calculating the subset of the updated parameters 501 for a first layer in the local neural network 404, where the transmitting the subset of the updated parameters 501 is performed contemporaneously with executing the backward pass for one or more subsequent layers in the local neural network 404.

In the method 600, the subset of the updated parameters 501 is one of a plurality of subsets of the updated parameters 501 transmitted in response to completion of every nth layer in the execution of the backward pass, where the method 600 further includes dynamically adjusting the value of n during the execution of the backward pass.

In the method 600, initiating the execution of the forward pass occurs prior to the receiving of the remote parameters, and the method 600 further includes updating the local neural network 404 with the remote parameters, and completing the execution of the forward pass to calculate the output based on the remote parameters.

The method 600 further includes updating the local neural network 404 with the remote parameters asynchronously in response to receiving the remote parameters, where transmitting the subset of the updated parameters 501 is performed asynchronously during execution of the backward pass in response to determining the updated parameters 501 for one of the plurality of layers in the neural network 404.

The method 600 further includes, in response to receiving the remote parameters, updating the local neural network 404 with the remote parameters by performing a direct memory write of the remote parameters to a local memory 403 in the local computing node 301.

In the method 600, the updated parameters 501 are determined for a first subset of neurons in the local neural network 404, and the method 600 further includes updating a second subset of neurons in the local neural network 404 with the remote parameters, where the first subset of neurons and the second subset of neurons are mutually exclusive.

The method 600 further includes, for each remote computing node of the set of remote computing nodes 302-304, at the remote computing node, receiving the subset of the updated parameters 501 from the local computing node 301, based on the updated parameters 501, executing a remote forward pass in a copy of the local neural network 404 stored in the remote computing node, determining the remote parameters during execution of a remote backward pass in the copy of the local neural network 404, and prior to completing the remote backward pass, transmitting the remote parameters from the remote computing node to the local computing node 301.

The method 600 further includes executing the forward pass in the local neural network 404 contemporaneously with executing the remote backward pass in at least one of the set of remote computing nodes 302-304.

A computing node 301 includes a communication network interface 401 configured to receive remote parameters from a set of one or more remote computing nodes 302-304, a processing unit 402 configured to execute a forward pass in a neural network 404 to calculate an output based on the remote parameters, and execute a backward pass in the neural network 404 to determine updated parameters 501 for the neural network 404, and a parameter server 405 coupled with the processing unit 402 and configured to, prior to completion of the backward pass, transmit a subset of the updated parameters 501 to the set of remote computing nodes 302-304.

In the computing node 301, the processing unit 402 is further configured to execute the backward pass by calculating the subset of the updated parameters 501 for a layer in the neural network 404, and the parameter server 405 is further configured to transmit the subset of the updated parameters 501 in response to determining that the subset of updated parameters 501 differs from a set of corresponding prior parameters for the layer.

In the computing node 301, the parameter server 405 is configured to transmit one or more of a plurality of subsets of the updated parameters 501 in response to completion of every nth layer in the execution of the backward pass, and the processing unit 402 is further configured to dynamically adjust the value of n during the execution of the backward pass.

The computing node 301 further includes a memory 403 coupled with the communication network interface 401, where the communication network interface 401 is further configured to update the neural network 404 by storing the remote parameters in the memory 403 via a direct memory write, and where the processing unit 402 is further configured to initiate the execution of the forward pass prior to the receiving of the remote parameters and, after updating of the neural network 404 with the remote parameters, complete the execution of the forward pass to calculate the output based on the remote parameters.

In the computing node 301, the communication network interface 401 is further configured to update the neural network 404 with the remote parameters asynchronously in response to receiving the remote parameters, and the parameter server 405 is further configured to transmit the subset of updated parameters 501 asynchronously during execution of the backward pass in response to determining the updated parameters 501 for one of the plurality of layers in the neural network 404.

A computing system 200 includes a communication network 310, and a plurality of computing nodes 301-304 coupled with the communication network 310, where each computing node of the plurality of computing nodes 301-304 includes a communication network interface 401 configured to receive remote parameters from the other computing nodes of the plurality of computing nodes 301-304, a processing unit 402 configured to execute a forward pass in a neural network 404 to calculate an output based on the remote parameters and execute a backward pass in the neural network 404 to determine updated parameters 501 for the neural network 404, and a parameter server 405 coupled with the processing unit 402 and configured to, prior to completion of the backward pass, transmit a subset of the updated parameters 501 to the other computing nodes.

In the computing system 200, the forward pass for a first computing node of the plurality of computing nodes 301-304 is executed contemporaneously with the execution of the backward pass for a second computing node of the plurality of computing nodes 301-304.

In the computing system 200, each computing node of the plurality of computing nodes 301-304 is configured to determine the updated parameters 501 for a different subset of neurons in the neural network 404.

In the computing system 200, for each computing node of the plurality of computing nodes 301-304, the communication network interface 401 of the computing node is further configured to update the neural network 404 with the remote parameters after initiation of the forward pass and prior to completion of the forward pass.

In the computing system 200, for each computing node of the plurality of computing nodes 301-304, the communication network interface 401 of the computing node is further configured to, in response to receiving the remote parameters, asynchronously update the neural network 404 with the remote parameters by performing a direct memory write of the remote parameters to a local memory 403 in the local computing node 301, and the parameter server 405 of the computing node is further configured to, during execution of the backward pass, transmit the subset of updated parameters 501 asynchronously in response to the processing unit 402 determining the updated parameters 501 for one of the plurality of layers in the neural network 404.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 200 and/or portions thereof carried on the computer-readable storage medium may be a database or other data structure which can be read by a program and used, directly or indirectly, to fabricate the hardware including the computing system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 200. The netlist may then be placed and routed to produce a data set describing geometric shapes to be applied to masks. The masks may then be used in various semiconductor fabrication steps to produce a semiconductor circuit or circuits corresponding to the computing system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   initiating execution of a forward pass through a plurality of layers of a local neural network in a computing node, wherein the computing node is one of a plurality of computing nodes in a communication network, and wherein each computing node comprises a local neural network with a plurality of layers and a local parameter server;
   after initiating the execution of the forward pass, receiving at the computing node remote parameters from one or more other computing nodes of the plurality of computing nodes before completing the execution of the forward pass through the plurality of layers of the local neural network, wherein the remote parameters are calculated in the one or more other computing nodes during the execution of the forward pass, and wherein the remote parameters are transmitted over the communication network during the execution of the forward pass;
   updating the local neural network with the remote parameters for one or more subsequent layers of the plurality of layers of the local neural network in the computing node;
   completing the execution of the forward pass to calculate a final output based on the remote parameters;
   initiating execution of a backward pass through the plurality of layers of the local neural network to determine updated parameters for one or more layers of the local neural network; and
   prior to completion of the backward pass, transmitting over the communication network the updated parameters for the one or more layers to the one or more other computing nodes and continuing the execution of the backward pass through the plurality of layers of the local neural network.

2. The method of claim 1, wherein:
   the execution of the backward pass comprises calculating the updated parameters for a first layer in the local neural network, and
   transmitting the updated parameters is performed in response to determining that the updated parameters for the layer differ from a set of corresponding prior parameters for the layer.

3. The method of claim 1, wherein the execution of the backward pass comprises calculating the updated parameters for a first layer in the local neural network, and wherein the transmitting the updated parameters is performed contemporaneously with executing the backward pass for one or more subsequent layers in the local neural network.

4. The method of claim 1, wherein the updated parameters are in one of a plurality of subsets of updated parameters transmitted in response to completion of every nth layer in the execution of the backward pass, and wherein the method further comprises dynamically adjusting a value of n during the execution of the backward pass.

5. The method of claim 1, wherein:
   updating the local neural network with the remote parameters is in response to receiving the remote parameters, wherein transmitting the updated parameters is performed during execution of the backward pass in response to determining the updated parameters for one of the plurality of layers in the neural network, and wherein the updating of the local neural network and the transmitting of the updated parameters are performed asynchronously with respect to the completion of the backward pass.

6. The method of claim 1, further comprising:
   in response to receiving the remote parameters, updating the local neural network with the remote parameters by performing a direct memory write of the remote parameters to a local memory in the computing node.

7. The method of claim 1, wherein:
   the updated parameters are determined for a first subset of neurons in the local neural network; and
   the method further comprises updating a second subset of neurons in the local neural network with the remote parameters, wherein the first subset of neurons and the second subset of neurons are mutually exclusive.

8. The method of claim 1, further comprising, for each other computing node of the one or more other computing nodes:
   at the other computing node, receiving the updated parameters from the computing node;
   based on the updated parameters, executing a remote forward pass in a copy of the local neural network stored in the other computing node;
   determining the remote parameters during execution of a remote backward pass in the copy of the local neural network; and
   prior to completing the remote backward pass, transmitting the remote parameters from the other computing node to the computing node.

9. The method of claim 8, further comprising:
   executing the forward pass in the local neural network contemporaneously with executing the remote backward pass in at least one of the one or more other computing nodes.

10. The method of claim 1, further comprising:
executing the forward pass by, for each layer of the plurality of layers in the local neural network, calculating an intermediate output for the layer based on at least one of:
   a set of inputs provided by a training instance, and
   an intermediate output of a preceding layer in the local neural network.

11. The method of claim 10, further comprising:
executing the backward pass by, for each layer of the plurality of layers in the local neural network, calculating the updated parameters for the layer based on an error between the final output determined from the forward pass and a desired output for the training instance.

12. A computing node, comprising:
a communication network interface configured to;
   receive remote parameters from one or more other computing nodes, and
   update a neural network by storing the remote parameters in a memory;
a processor configured to:
   initiate the execution of a forward pass through a plurality of layers of the neural network prior to the receiving of the remote parameters, wherein the remote parameters are calculated in the one or more other computing nodes during the execution of the forward pass, wherein the remote parameters are transmitted during the execution of the forward pass, wherein the computing node is one of a plurality of computing nodes in a communication network, and wherein each computing node comprises a local neural network with a plurality of layers and a local parameter server,
   after updating of the neural network with the remote parameters, complete the execution of the forward pass to calculate a final output based on the remote parameters for one or more subsequent layers of the plurality of layers of the local neural network in the computing node, and
   execute a backward pass through the plurality of layers of the neural network to determine updated parameters for the neural network; and
a parameter server circuit coupled with the processor and configured to, prior to completion of the backward pass, transmit over the communication network the updated parameters for the one or more layers to the one or more other computing nodes and continuing execution of the backward pass through the plurality of layers of the local neural network.

13. The computing node of claim 12, wherein:
the processor is further configured to execute the backward pass by calculating the updated parameters for a layer in the neural network, and
the parameter server circuit is further configured to transmit the updated parameters in response to determining that the updated parameters differ from a set of corresponding prior parameters for the layer.

14. The computing node of claim 12, wherein:
the parameter server circuit is configured to transmit one or more of a plurality of subsets of the updated parameters in response to completion of every nth layer in the execution of the backward pass, and
the processor is further configured to dynamically adjust a value of n during the execution of the backward pass.

15. The computing node of claim 12,
wherein the communication network interface is further configured to store the remote parameters in the memory via a direct memory write.

16. The computing node of claim 12, wherein:
the communication network interface is further configured to, in response to receiving the remote parameters, update the neural network with the remote parameters asynchronously with respect to the completion of the backward pass, and
the parameter server circuit is further configured to, during execution of the backward pass and in response to determining the updated parameters for one of a plurality of layers in the neural network, transmit the updated parameters asynchronously with respect to completion of the backward pass.

17. The computing node of claim 12, wherein the processor is further configured to:
execute the forward pass by, for each layer of a plurality of layers in the neural network, calculating an intermediate output for the layer based on at least one of:
   a set of inputs provided by a training instance, and
   an intermediate output of a preceding layer in the neural network; and
execute the backward pass by, for each layer of the plurality of layers in the neural network, calculating the updated parameters for the layer based on an error between the final output determined from the forward pass and a desired output for the training instance.

18. A computing system, comprising:
a communication network; and
a plurality of computing nodes coupled with the communication network, wherein each computing node of the plurality of computing nodes comprises:
   a communication network interface configured to receive remote parameters from the other computing nodes of the plurality of computing nodes, wherein each computing node comprises a local neural network with a plurality of layers and a local parameter server;
   a processor configured to:
      execute a forward pass through a plurality of layers of a neural network to calculate a final output based on the remote parameters for one or more subsequent layers of the plurality of layers of the local neural network in the computing node, and
      execute a backward pass through the plurality of layers of the neural network to determine updated parameters for the neural network; and
   a parameter server circuit coupled with the processor and configured to, prior to completion of the backward pass, transmit over the communication network the updated parameters for the one or more layers to the other computing nodes and continuing execution of the backward pass through the plurality of layers of the local neural network, wherein for each computing node of the plurality of computing nodes, the communication network interface of the computing node is further configured to update the neural network with the remote parameters after initiation of the forward pass and prior to completion of the forward pass, wherein the remote parameters are calculated in one or more of the other computing nodes during the execution of the forward pass, and the remote parameters are transmitted during the execution of the forward pass.

19. The computing system of claim 18, wherein the forward pass for a first computing node of the plurality of computing nodes is executed contemporaneously with the execution of the backward pass for a second computing node of the plurality of computing nodes.

20. The computing system of claim 18, wherein each computing node of the plurality of computing nodes is configured to determine the updated parameters for a different subset of neurons in the neural network.

21. The computing system of claim 18, wherein for each computing node of the plurality of computing nodes:
   the communication network interface of the computing node is further configured to, in response to receiving the remote parameters, update the neural network with the remote parameters by performing a direct memory write of the remote parameters to a local memory in the computing node, wherein the update of the neural network is asynchronous with respect to the completion of the backward pass; and
   the parameter server circuit of the computing node is further configured to, during execution of the backward pass, transmit the updated parameters in response to the processor determining the updated parameters for one of the plurality of layers in the neural network, wherein the transmitting the updated parameters is asynchronous with respect to the completion of the backward pass.

* * * * *

UNITED STATES PATENT AND TRADEMARK OFFICE
CERTIFICATE OF CORRECTION

PATENT NO. : 11,630,994 B2
APPLICATION NO. : 15/898433
DATED : April 18, 2023
INVENTOR(S) : Khaled Hamidouche et al.

It is certified that error appears in the above-identified patent and that said Letters Patent is hereby corrected as shown below:

In the Claims

At Column 16, Claim 3, Line 16, please delete "the transmitting the updated parameters" and insert --the transmitting of the updated parameters--

At Column 19, Claim 21, Line 23, please delete "the transmitting the updated parameters" and insert --the transmitting of the updated parameters--

Signed and Sealed this
Twenty-seventh Day of June, 2023

Katherine Kelly Vidal
*Director of the United States Patent and Trademark Office*